July 29, 1952 W. R. FRANK ET AL 2,604,746
FLEXIBLE OFFSET DISK HARROW
Filed Dec. 31, 1949 2 SHEETS—SHEET 1

INVENTOR.
WILLIAM R. FRANK
LAWRENCE A. CROSSON
BY
ATTORNEY

July 29, 1952 W. R. FRANK ET AL 2,604,746
FLEXIBLE OFFSET DISK HARROW
Filed Dec. 31, 1949 2 SHEETS—SHEET 2
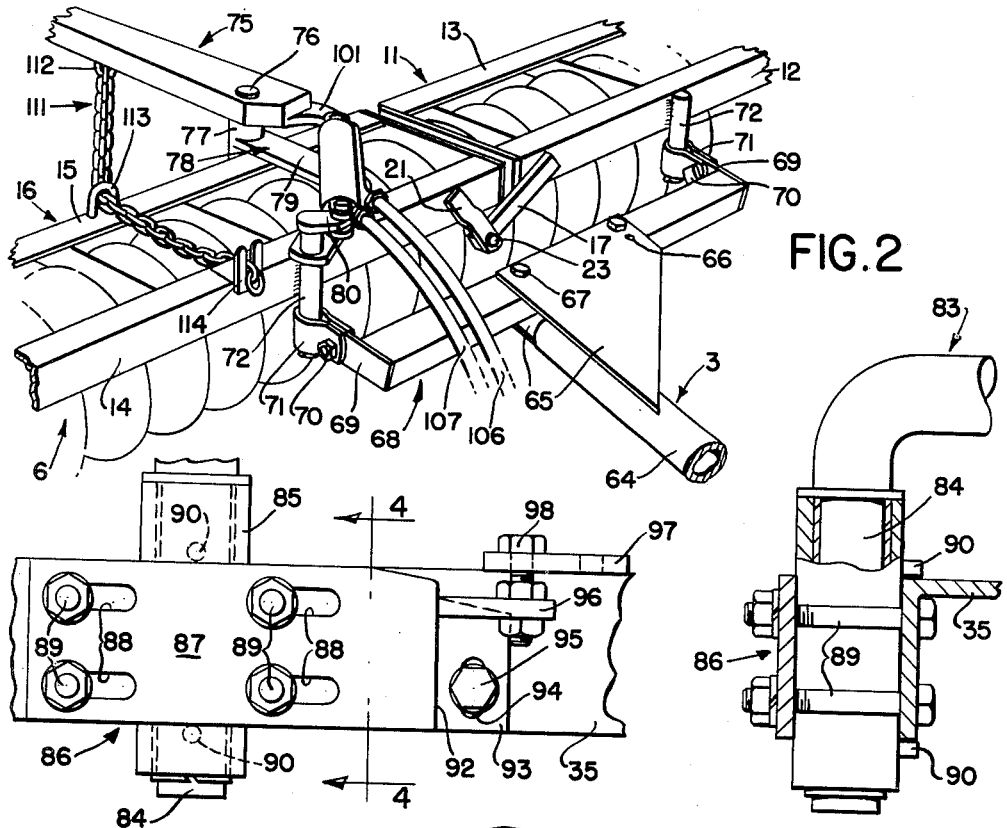
FIG. 2
FIG. 3
FIG. 4
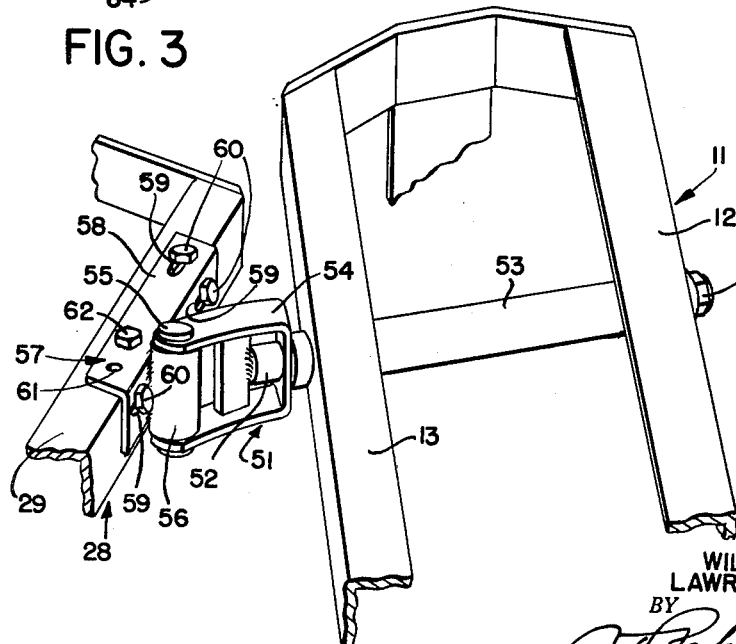
FIG. 5
INVENTOR.
WILLIAM R. FRANK
LAWRENCE A. CROSSON
BY
ATTORNEY Patented July 29, 1952

2,604,746

UNITED STATES PATENT OFFICE 2,604,746

FLEXIBLE OFFSET DISK HARROW

William R. Frank, Bell, and Lawrence A. Crosson, Los Angeles, Calif., assignors to John Deere Killefer Company, Los Angeles, Calif., a corporation of California Application December 31, 1949, Serial No. 136,386

3 Claims. (Cl. 55—83)

The present invention relates generally to agricultural implements and more particularly to disk harrows.

The object and general nature of the present invention is the provision of an offset disk harrow especially arranged and constructed so as to work a wider strip of ground than can be handled by the ordinary or conventional offset disk harrow but without the complicated interconnecting linkages and latching devices usually found on squadron harrows, usually composed of two offset disk harrows connected in side-by-side relation when it is desired to provide a large capacity implement.

More specifically, it is an important feature of this invention to provide a large capacity disk harrow comprising two pivotally interconnected gangs with each gang including two hingedly connected sections, whereby a relatively wide strip of ground may be harrowed with the disks operating at substantially constant depth throughout the entire width of the machine. Further, it is a feature of this invention to provide means hingedly interconnecting the outer or hinged gang sections so as to accommodate the movement of the outer sections relative to the inner sections, as when passing over uneven ground while holding the sections in the proper position for best operation. Additionally, it is a feature of this invention to provide a disk harrow having two angularly related gangs, each gang including inner and outer sections hingedly connected together at their adjacent ends, with means associated with the inner ends of one section of each gang for pivotally interconnecting the gangs and means associated with the outer sections of the gangs for establishing and controlling the operating angle between the gangs.

It is also an important feature of this invention to provide a disk harrow in which each gang consists of two hingedly interconnected sections, with means comprising a pair of hingedly connected parts hingedly connected to the outer sections of the gangs for holding the outer sections in substantially the same plane, irrespective of the operating angle between the gangs and also irrespective of the hinging of the outer sections relative to the inner sections, which may occur when the outfit is drawn over uneven ground in operation.

These and other objects and advantages of the present invention will be apparent to those skilled in the art after a consideration of the following detailed description, taken in conjunction with the accompanying drawings, in which:

Figure 2 is a fragmentary perspective view showing the latch structure and associated parts.

Figure 3 is an enlarged elevational view of the adjusting mechanism through which the rear angling link is hingedly connected to the outer rear gang frame.

Figure 4 is a sectional view taken along the line 4—4 of Figure 3.

Figure 5 is a fragmentary perspective view showing the pivot connection between the inner ends of the inner front and rear gang frames.

Figure 1:
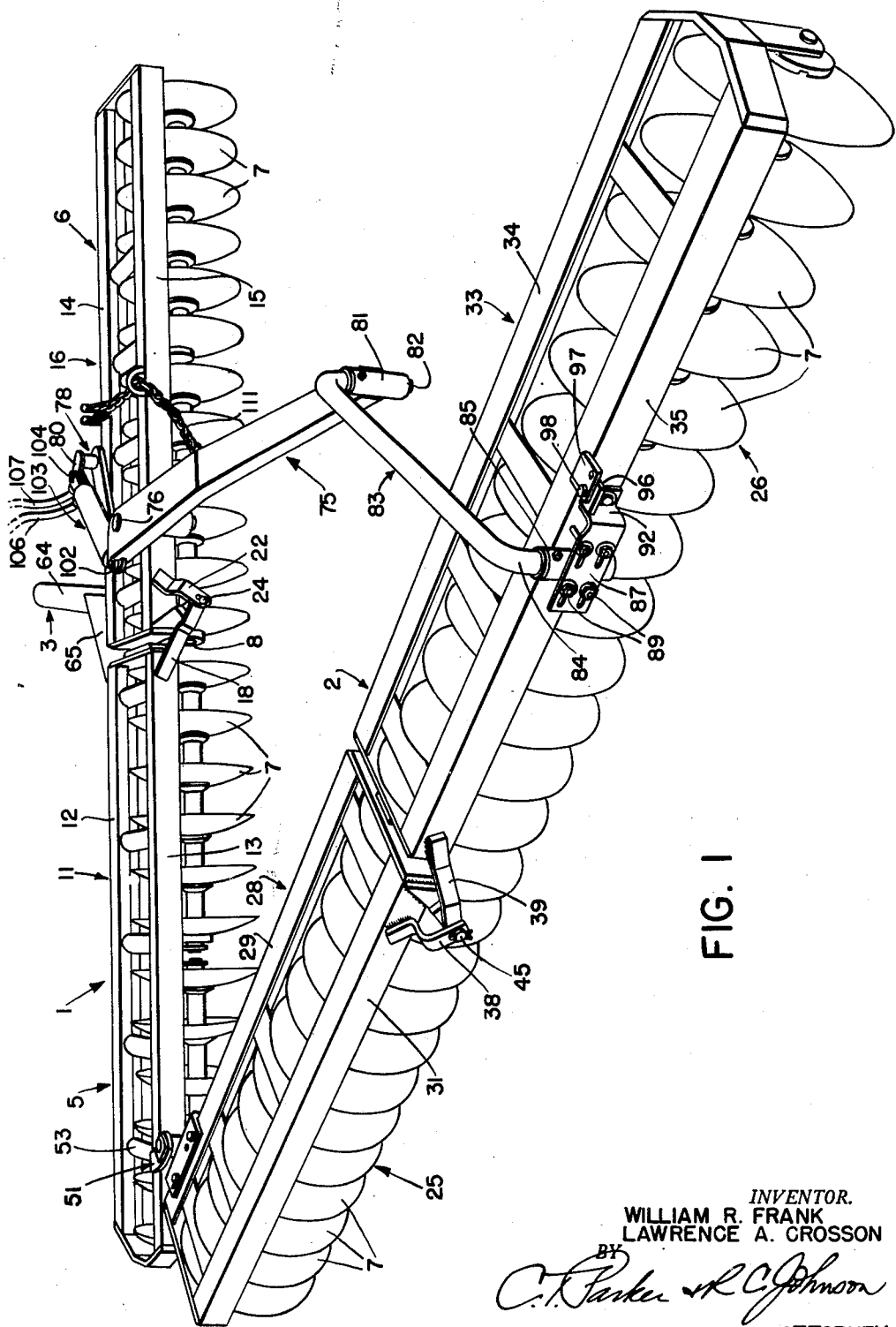
Figure 1 is a perspective view, as seen from the rear, of an offset disk harrow in which the principles of the present invention have been embodied.

Referring now to the drawings, the disk harrow in which the principles of the present invention have been incorporated includes a front gang 1, a rear gang 2, and a hitch frame 3. In the preferred form of construction, each of the front and rear gangs 1 and 2 comprises two hingedly interconnected sections. The front gang 1 includes an inner section 5 and an outer section 6. Each section includes a plurality of soil-working disks 7 mounted in any suitable way on a gang bolt 8 and held in proper position by spacers, as in conventional constructions. The inner section 5 also includes a gang frame 11 comprising front and rear bars 12 and 13, and the outer section 6 includes a similar gang frame 16 comprising front and rear frame members 14 and 15. Each of the gang frames also includes suitable crossbars and supporting connections extending downwardly to bearings mounted on the associated gang bolt. The two sections 5 and 6 are hingedly interconnected by virtue of a pair of downwardly and outwardly extending bars 17 and 18 fixed to the front and rear gang frame members 12 and 13 and extending downwardly and outwardly therefrom into overlapping relation with respect to a pair of similar bars 21 and 22 fixed to the front and rear gang frame members 14 and 15. The overlapping portions of the bars are apertured to receive front and rear pivot members 23 and 24.

The rear gang 2 is of similar construction, comprising an inner section 25 and an outer section 26. The inner section 25 includes a gang frame 28 comprising front and rear frame bars 29 and 31, and the outer section 26 includes a gang frame 33 which is made up of a front frame member 34 and a rear gang frame member 35. The sections 25 and 26 of the rear gang 2 are hingedly interconnected by means of a pair of downwardly and outwardly extending bars 38 fixed to the outer ends of the gang frame members 29 and 31 of the inner section 25 and a cooperating pair of downwardly and inwardly extending bars 39 fixed to the inner ends of the frame bars 34 and 35 of the outer sections 26, the overlapping portions of the bars being apertured to receive pivot means 45. It will be noted that the pivot means 23, 24 and 45 form generally fore and aft extending axes by which the sections of the front and rear gangs may move, one relative to the other, in a generally vertical direction, but such interconnection holds the gang sections in endwise alignment and retains them against relative movement in a horizontal direction.

The pivotal connection between the front and rear gangs 1 and 2 comprises a fork member 51 (Figure 5) which is carried by the frame 11 of the front inner gang section and which comprises a shaft section 52 rockably disposed in a sleeve 53 carried at the inner end portions of the frame members 12 and 13 and a generally vertically disposed yoke section 54 having upper and lower portions which are apertured to receive a vertical pivot member 55 which is disposed in the sleeve portion 56 of a bracket member 57. The latter member includes an attaching angle 58 which is slotted, as at 59, to receive a plurality of bolts 60 carried by the inner end of the gang frame angle member 29. One end of the upper flange of the angle 58 has a pair of spaced openings 61, in either of which a fourth bolt 62 may be disposed for definitely locating the bracket 57 relative to the rear inner gang frame 28. A collar 63 is bolted to the forward end of the shaft 52 for holding the latter in the sleeve 53. By loosening the bolts 60 and removing the bolt 62, the bracket 57 may be adjusted on the front angle 29 of the frame 28 of the rear inner gang 25.

The hitch structure 3 is connected to the two hingedly interconnected front sections 5 and 6. The hitch structure 3 includes a main draft bar 64 to the inner portion of which upper and lower, generally triangular shaped plates 65 are fixed along their right-hand edges. The outer portions of the plates 65 are apertured, as at 66, and rearwardly of the rear end of the draft bar 64 the plates 65 are apertured to receive a hitch pin 67 by which the draft bar is connected to a crossbar structure 68. A bolt 69 extends through certain of the apertures 66 in the plates 65 to connect left-hand portions to the crossbar structure 68, whereby the main draft bar 64 is connected with the crossbar 68 in a laterally rigid relationship. The crossbar structure 68 includes end brackets 69 which are apertured to receive bolts 70 whereby they are connected to swivels 71 rockably carried at their lower ends of a pair of vertical bars 72 that are welded at their upper ends to the front frame members 12 and 14 of the front gangs, respectively. The connections between the draft structure 3 and the sections 5 and 6 of the front gang 1 have sufficient looseness to accommodate the pivoting of the inner and outer sections of the gang 1 relative to each other about the transverse horizontal axis defined by the pivots 23 and 24.

The angle between the front and rear gangs 1 and 2 is controlled by mechanism that is carried entirely on the laterally outer gang sections 6 and 26 which are hingedly connected, as described above, to the inner front and rear gang sections 5 and 25. The angle-controlling mechanism includes a lever 75 carried by the front laterally outer section 6, preferably by means of a heavy vertically arranged pivot member 76 fixed rigidly to the lever 75 and extending downwardly into a vertical sleeve section 77 carried by a bracket 78 which is fixed, as by welding, to the front and rear frame bars 14 and 15 at the laterally inner end portion of the gang frame 16 of the outer front section 6. Preferably, the bracket 78 comprises a generally L-shaped bar 79 apertured at its forward end to receive the upper end of the right-hand hitch bar 72 to which the bracket 78 is welded. A cylinder-receiving lug 80 is welded to the upper end of the right-hand hitch bar 72. The lever 75 is formed of plates welded together to form a box section, the lever 75 being formed as a generally rearwardly extending, elongated arm which is rigid against both lateral and vertical deflection as well as against torsional forces. The rear or outer end of the arm 75 carries a generally vertically disposed, elongated sleeve 81, and the latter member receives the downturned end 82 of a substantially rigid link member 83, the rear end 84 of which is disposed in a vertically arranged sleeve member 85 that forms a part of an adjustable bracket structure indicated in its entirety by the reference numeral 86

As best shown in Figure 3, the adjustable bracket structure 86 includes a plate 87 having a plurality of slots 88 to receive bolts 89 which extend through openings in the frame angle 35 by which the bracket 86 is fixed to the associated gang frame. The sleeve section 85 has upper and lower lugs 90 between which the frame member 35 is received. The bracket plate 87 is offset, as at 92, to provide a section 93 which has a vertical slot 94 to receive a clamping bolt 95. Secured to the offset portion 92 and the upper part of the bracket section 93 is a horizontal plate 96 disposed underneath a rearwardly extending lug 97 having a pair of holes therein, in either of which an adjusting bolt 98 may be disposed. By loosening the bolts 89, 95 and 98, the bracket structure 86 may be shifted laterally or tilted about a generally fore and aft extending axis to dispose the link-receiving sleeve 85 in the proper position on the right-hand rear gang frame. Each of the ends 83 and 84 of the link 83 carries an upper shoulder 99 and a lower removable snap ring 100 which hold the link ends in the sleeves 81 and 85.

The connections established by virtue of the above mentioned vertical sleeves 81 and 85 and the vertically disposed pivot pin 76 are in the nature of hinged connections which are adapted to hold the laterally outer front and rear gang sections 6 and 26 against vertical displacement and lateral tilting, one with respect to the other, while accommodating the angling and straightening of the front and rear gangs 1 and 2 as pivotally interconnected units. That is, the tendency for one end of one of the outer sections to rise is opposed by the connection with the other section, in which the disks 7 are arranged oppositely, through the rigid lever 75, substantially rigid link 83 and associated hinged connections. However, link 83 will deflect as a torsion spring during an instant when the front gang sections are operating on terrain covered by the rear gang sections.

The gangs 1 and 2 are shifted into and out of straightened and angled operation positions by means connected with the lever 75. Preferably, an arm 101 is carried by or forms a part of the lever 75, thereby forming a bell crank, and is apertured to receive the piston rod 102 of a hydraulic power unit 103, the other or cylinder end of which is connected, as at 104, to the lug or bracket 80 which forms a part of the bracket member 78. Power is delivered to the hydraulic unit 103 through a pair of hose lines 106 and 107. If it should be desired to mechanically limit the angle into which the front and rear gangs 1 and 2 may be moved, a chain 111 may be connected to a bracket 112 carried on the arm 75 and extended at its forward portion through a guide 113 on the rear gang frame member 15 and connected at its forward end to a slotted bracket 114 fixed to the forward gang frame member 14, which forms a part of the laterally outer forward section 6. By engaging different links of the chain 111 in the slotted portion of the bracket 114, the maximum angle into which the harrow may be moved is determined. Similarly, the harrow may be locked for transport position, with the gang sections parallel, by disposing one of the rearward links of the chain 111 in the slotted bracket 114, thus holding the harrow in a position for easy transport when the hydraulic unit 103, which frequently forms a part of the propelling tractor, is removed.

The harrow described above is of simple sturdy construction and is adapted to work a comparatively wide strip of ground, but the harrow adapts itself to uneven ground conditions by virtue of the hinged connections between the inner and outer sections of each gang, yet by virtue of the rigid hinged connecting means acting between the laterally outer gang sections, the latter sections, as well as the inner sections, are held in the proper position for good operation at all times.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A disk harrow comprising a pair of gangs, means pivotally connecting said gangs together at one end for movement into and out of angled position, each gang comprising a pair of sections arranged in end-to-end relation and means hingedly connecting the section of each gang for movement about a generally horizontal axis, and means acting between the outer sections of said gangs for angling and straightening the latter.

2. A disk harrow comprising a pair of gangs, each gang including a pair of sections arranged in end-to-end relation, and means hingedly connecting said section for movement one relative to the other about a horizontal generally fore and aft extending axis but restraining said sections against relative movement in a generally horizontal direction, means pivotally connecting said gangs together for movement about a generally vertical axis into and out of angled relation, said pivotal connecting means including parts fixed, respectively, to one end of one section of each gang, and hingedly connected parts hingedly connected, respectively, to the other section of said gangs for controlling the angle between said gangs, said hingedly connected parts and their hinged connection to said other parts serving to interconnect said other sections and to hold them in substantially the same plane relative one another.

3. A disk harrow comprising a pair of gangs, means pivotally connecting said gangs at one end for horizontal movement into and out of angled position, each of said gangs comprising a pair of sections and said hinged connecting means connecting one section of one gang to one section of the other gang, and means for controlling the angle between said gangs comprising a bell crank, a vertical pivot member rigidly fixed at its upper end to said bell crank, a relatively long bearing sleeve fixed in a generally vertical position to the other section of said one gang and receiving said vertical pivot member whereby said bell crank is pivotally mounted for movement about a generally vertical axis on the other section of said one gang, a second relatively long bearing sleeve fixed in a generally vertical position to one arm of said bell crank, a third relatively long bearing sleeve fixed to the other section of the other gang, a relatively rigid link having generally vertically disposed end portions journaled, respectively, in said second and third relatively long bearing sleeves and cooperating with said vertical bell crank pivot member and said first mentioned bearing sleeve to cause said bell crank and link to hold said other sections of said gangs substantially in the same plane, and means connected with said bell crank for swinging the latter to change the angle between said gangs.

WILLIAM R. FRANK.
LAWRENCE A. CROSSON.

REFERENCES CITED

The following references are of record in the file of this patent:

UNITED STATES PATENTS

| Number | Name | Date |
| --- | --- | --- |
| 1,227,237 | Bartholomew | May 22, 1917 |
| 2,164,210 | Johnson | June 27, 1939 |
| 2,230,041 | Lindgren et al. | Jan. 28, 1941 |
| 2,303,320 | Benjamin et al. | Dec. 1, 1942 |